April 18, 1950

V. KLÍMA 2,504,537

COMMUTATOR WINDING FOR MULTIPHASE COMMUTATOR MACHINES

Filed Feb. 14, 1948

INVENTOR.
VILEM KLÍMA

April 18, 1950     V. KLÍMA     2,504,537
COMMUTATOR WINDING FOR MULTIPHASE
COMMUTATOR MACHINES Filed Feb. 14, 1948     8 Sheets-Sheet 3

Inventor:
Vilém Klíma

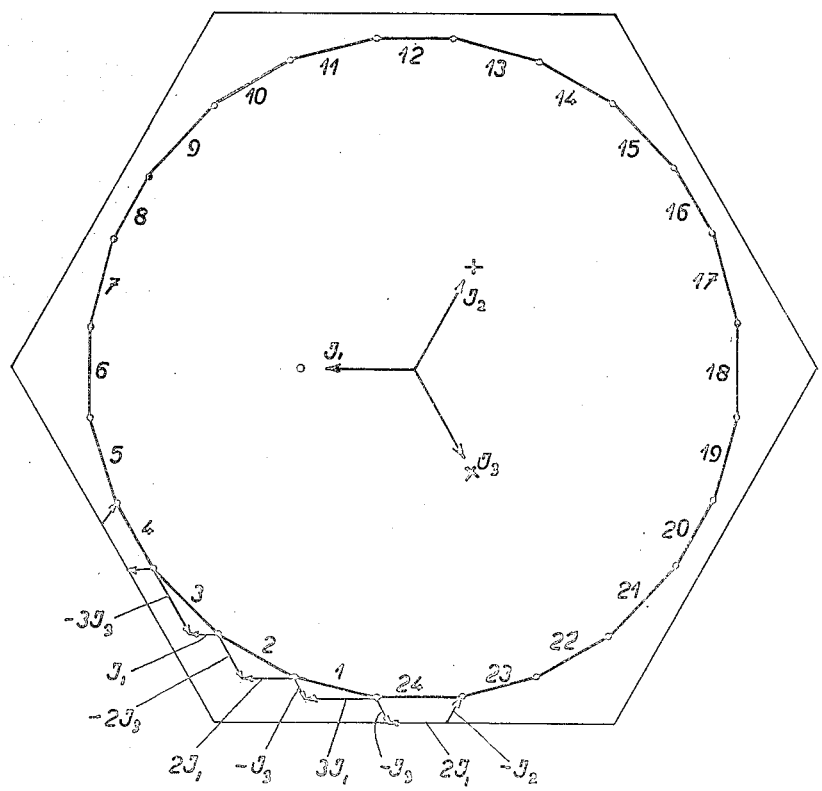

April 18, 1950   V. KLÍMA   2,504,537
COMMUTATOR WINDING FOR MULTIPHASE
COMMUTATOR MACHINES
Filed Feb. 14, 1948   8 Sheets-Sheet 6

Inventor:
Vilém Klíma
by Paul H. Smolka

Patented Apr. 18, 1950

2,504,537

UNITED STATES PATENT OFFICE 2,504,537

COMMUTATOR WINDING FOR MULTIPHASE COMMUTATOR MACHINES

Vilém Klíma, Prague, Czechoslovakia, assignor of one-half to Moravian Electrical Engineering Works, National Corporation, Olomouc, Czechoslovakia Application February 14, 1948, Serial No. 8,440
In Czechoslovakia December 5, 1946

Section 1, Public Law 690, August 8, 1946
Patent expires December 5, 1966

10 Claims. (Cl. 171—206)

This invention relates to polyphase A. C. dynamoelectric commutator machines and, more particularly, to a novel method of winding the armatures of such machines and conducting current to the armature windings.

In such polyphase commutator machines, it is a known fact that the commutation is improved and the commutation current is decreased correspondingly with an increase in the number of phases. Furthermore, the improvement in commutation is a direct effect of the uniformity of distribution of the commutating conductors around the circumference of the armature. To achieve these results, it has been proposed to use not only a larger number of phases but also a larger number of armature windings, with the pitch of the windings being such that the commutating conductors are regularly distributed around the circumference of the armature.

From the motor winding art, it is known that the distribution of the commutating conductors over an even number of slots, with the current being supplied through an odd number of brush feeding points, can be attained in the same manner as when the number of feeding points is double. There is an advantage to this arrangement, in that too large a number of phases results in an uneven current distribution over the individual phases. However, the provision of an odd number of feeding points presents difficulties due to the difficulty of constructing a transformer with an odd number of phases greater than three. For example, the primary current supply usually is three-phase, and conversion of a three-phase supply to a larger odd number of phases can be attained only with difficulty and with complications.

To overcome these difficulties of the prior art arrangements, the present invention provides a novel winding arrangement for the armatures of polyphase commutator dynamoelectric machines in which the advantages of a cage commutation winding are attained with the use of only half the number of phases hitherto considered necessary. With this in mind, two winding sections are connected in parallel between the same feeding points of commutator bars, with both winding sections being positioned in different slots. The winding sections have parallel conductor portions, with the distance between the corresponding portions of the two windings being exactly equal to the pole pitch. Consequently the same magnetomotive force is created at both the north pole and the south pole, even if the feeding points, or brushes, are not in diametrically opposite portions in the case of bi-polar arrangement. The pitch of the windings may be equal to the full pole pitch, or may be less than the full pole pitch. Preferably, the windings have either a decreased or increased pitch, relative to the pole pitch, with this increase or decrease being equal to an odd number of slot pitches.

Accordingly, it is an object of the present invention to provide a novel winding arrangement for polyphase A. C. commutator dynamoelectric machines.

Another object is to provide such a winding arrangement having an odd number of feeding points.

A further object is to provide such an arrangement in which two winding sections are connected in parallel between the same two feeding points and have corresponding slot conductors spaced a distance equal to the pole pitch.

These, and other objects, advantages and novel features of the invention will be apparent from the following description and the accompanying drawings.

In the drawings:

Fig. 7 is a chart showing the current distribution in the slot conductors of the winding arrangement of Fig. 6.

Fig. 8 is a vector diagram of the slot currents of the winding of Fig. 6.

Figure 3:
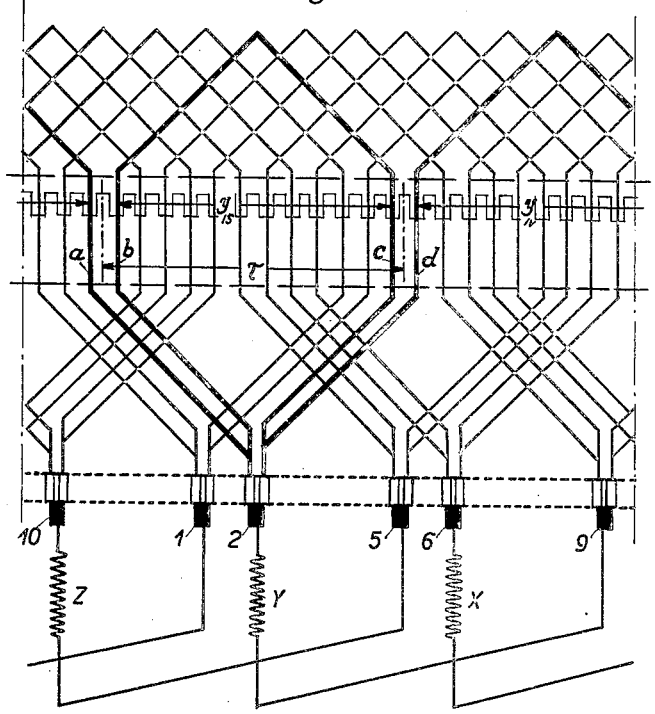
Fig. 3 is a developed view of the armature winding of Fig. 1.
Figure 6:
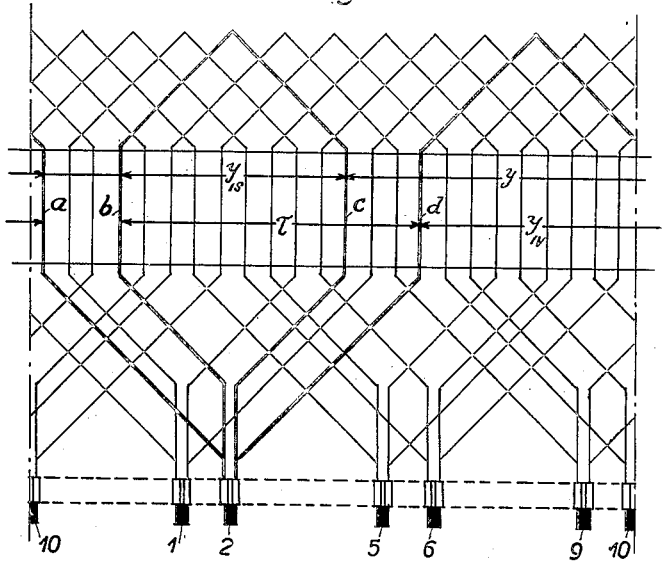
Fig. 6 is a developed view of an armature winding, similar to that of Fig. 3, with the winding pitch decreased by three slot pitches.
Figure 9:
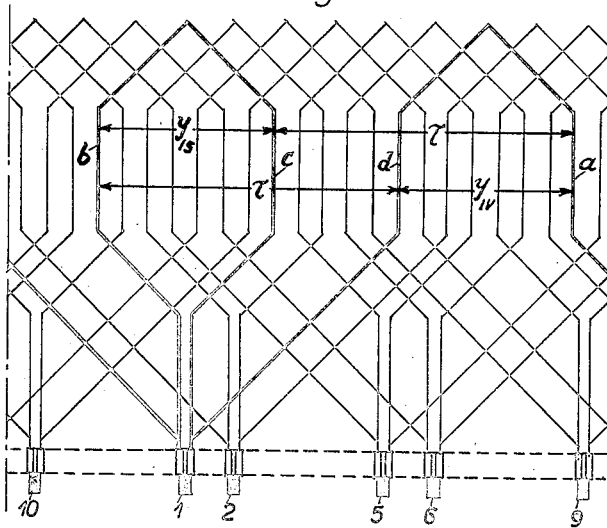
Fig. 9 is a view similar to Fig. 6 showing a winding having its pitch decreased by five slot pitches.
Figure 10:
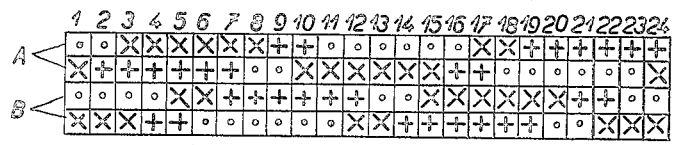
Fig. 10 is a chart of the slot currents in the winding of Fig. 9.
Figure 14:
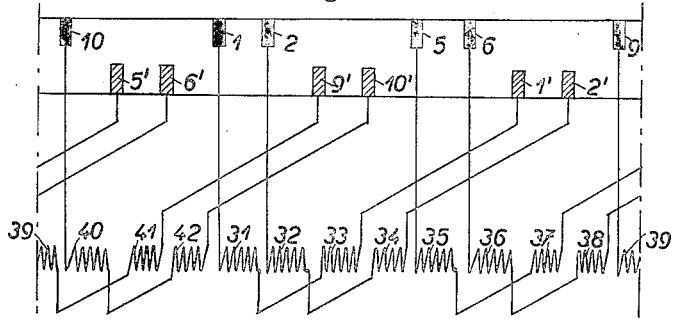

Fig. 14 schematically illustrates a different brush arrangement for the winding shown in Figs. 3, 6 and 9.

Figure 15:
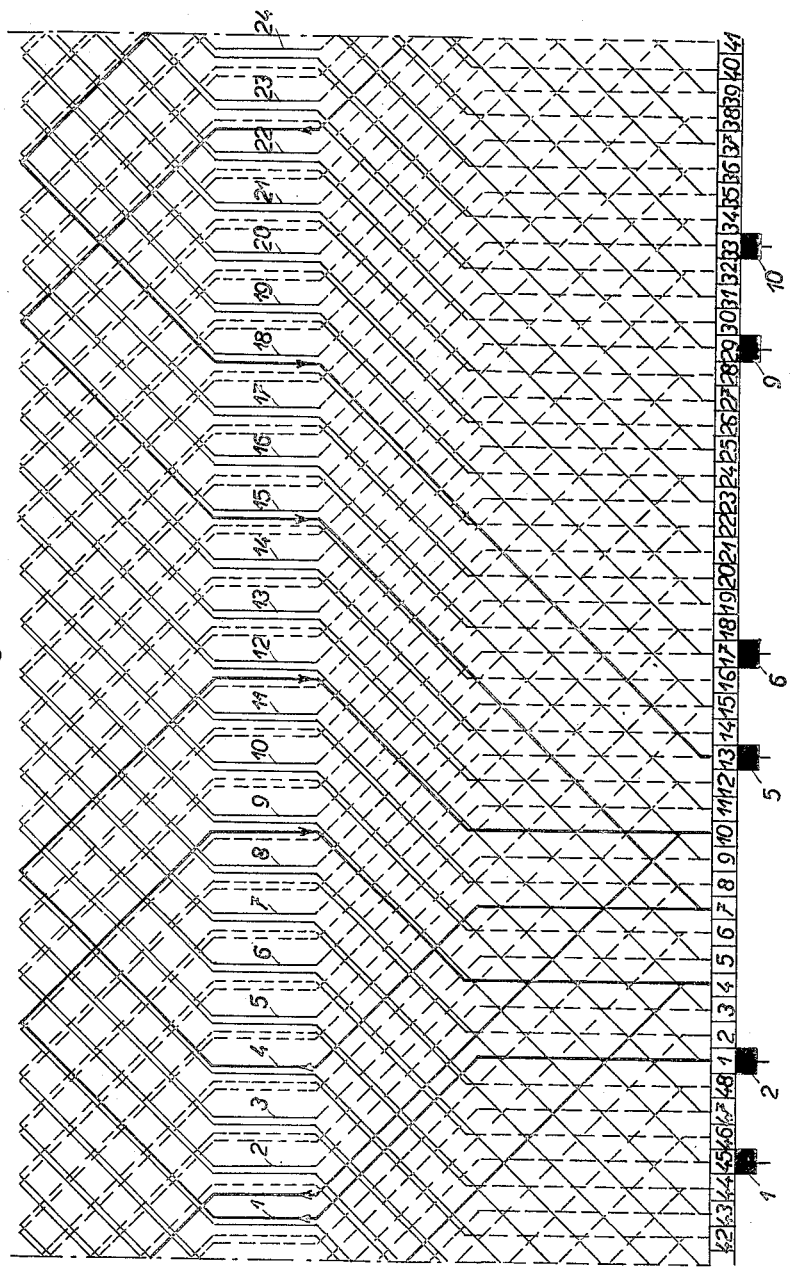

Fig. 15 is a full development of a modified armature winding according to the invention.

Figure 1:
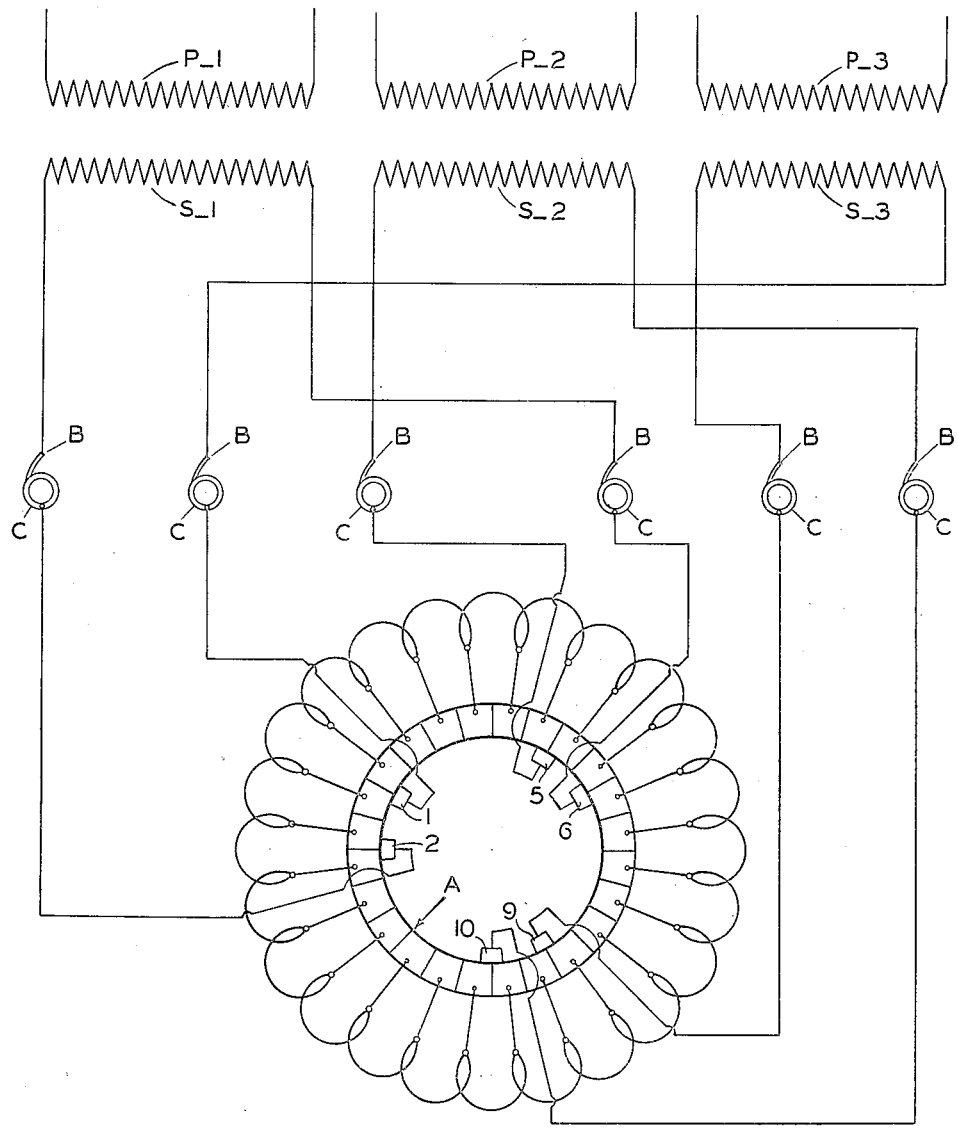
Fig. 1 is a schematic wiring diagram of an armature winding and its feeding arrangement in accordance with the present invention.

Referring first to Fig. 1, the armature A of a commutator type polyphase A. C. dynamoelectric machine is illustrated as supplied with current from a polyphase transformer arrangement having primary windings P—1, P—2 and P—3, and secondary windings S—1, S—2, and S—3. The windings are connected to brushes indicated at B which engage commutator segments indicated at C. The winding of armature A is illustrated as having 12 feeding points, of which 6 are shown as connected to commutator sections.

Figure 2:
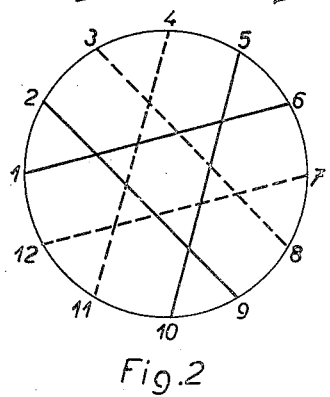
Fig. 2 is a voltage polygon of the winding arrangement of Fig. 1 when used with a bi-polar machine.

Fig. 2 shows schematically a bi-polar polygon of the voltages. The circle illustrates the voltages of the windings and the numbers 1 to 12 indicate the feeding points. In contradistinction to Fig. 1 the odd numbers are diametrically opposite to each other. By leaving out one half of the feeding points (for instance the even points) the number of commutating slots with a full pitch is decreased to one half. By shortening the pitch to ⅚, the original number of commutating points can be reached. With an odd number of feeding points, (5) according to Fig. 1, the number of commutating points is for instance 10; this is little, but by the arrangement of a double winding they can be increased to twenty points pro one pair of poles; this is a sufficient number of feeding points to make possible regular slotting and results in small pulsations of higher harmonic fields. With the arrangement according to Fig. 2 with six regularly distributed feeding points and with a pitch of the coils of ⅚ of the pole pitch there are twelve commutating points on the circumference; however, by subdividing of the winding to two windings this number cannot be increased any more because with subdividing of the winding into two windings connected in parallel, there are always two coils connected in parallel in slots which situated diametrically opposite to each other, so that there are again coils in twelve slots, which is substantially less than twenty, although the number of feeding points is six, which is greater than five according to Fig. 1.

The mentioned drawbacks can be avoided by the arrangement according to the present invention. With the arrangement illustrated in Fig. 2 one-half of the feeding points is left out, however not all even numbers, but the winding is carried out in the following way; with an evenly distributed number of feeding points equal to a multiple of four (for instance 12), they are fed in such a way that all odd points are the beginning (e. g. 1, 3, 5, 7, 9, 11) and the even points are the ends (e. g. 6, 8, 10, 12, 2, 4); from the so obtained circuits which are half in number (1—6, 3—8, 5—10, 7—12, 9—2, 11—4) half of the circuits are left out and this is always done in such a way that points arranged diametrically opposite are not feeding points.

For instance, the circuits 1—6, 5—10, 9—2, drawn with full lines in Fig. 2 remain and the circuits 3—8, 7—12, 11—4, illustrated in Fig. 2 by dashed lines, are left out. With this arrangement the number of commutating points with a full pitch of the coils according to Fig. 2 is equal to 12 and it can be increased to 24 subdividing the coils to two parallel connected coils.

In Fig. 3 is illustrated the winding of a bi-polar armature according to the invention. Only those coils are shown which are just in a commutating position. As it can be seen, the commutating coils are evenly distributed around the circumference of the armature. The one loop $bc$, which has a pitch $y_{1s}$ one slot shorter that the pole pitch is just commutating as is also the wave with the pitch, $y_{1v}-y_{1s}$ in the slots $da$, which are at a distance from $bc$ equal to one pole pitch. The voltage of the wave and of the loop is therefore equal in both coils and can therefore be connected to the same segments.

Figures 4, 5:
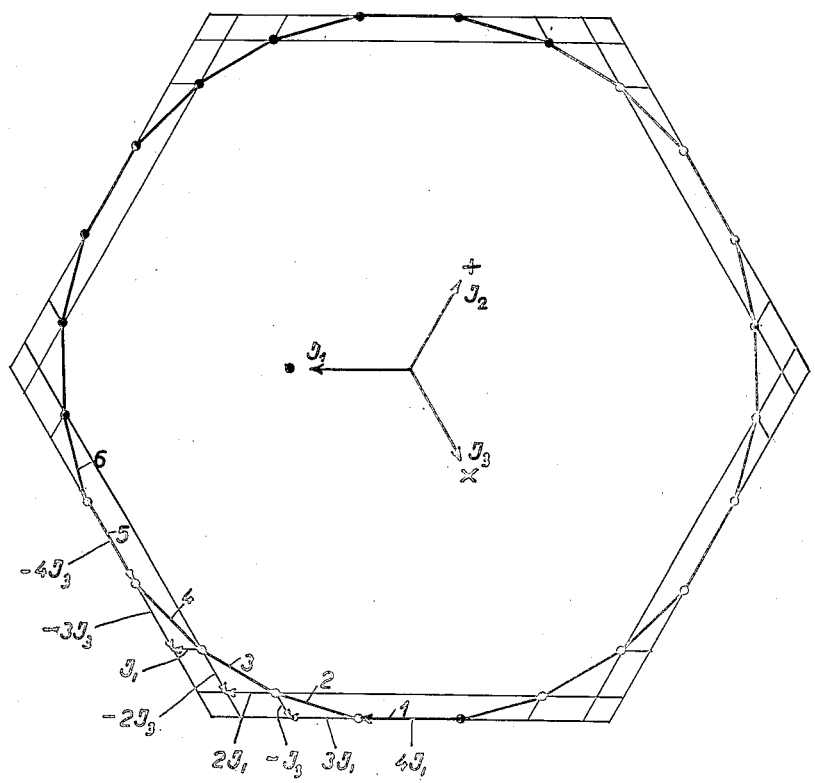
Fig. 4 is a chart illustrating the current distribution in the slot conductors of the winding arrangement illustrated in Fig. 3.
Fig. 5 is a Görges diagram of the magnetomotive forces of the winding arrangement of Fig. 3.

Another advantage of this subdivision of the winding into two coils connected in parallel, even if they are positioned in different slots, is to be seen in the fact that the current, fed to the armature, distributes itself into two windings which are at a distance corresponding precisely to the pole pitch, so that the same magnetomotive force is created at the north pole and the south pole even if the brushes (as can be seen from Fig. 3) are not in a diametrically opposed position in the case of a bi-polar arrangement and even if the pitch of the winding is shortened. The distribution of the current through the windings in the slots according to Fig. 3 is shown in Fig. 4 wherein A indicates the loop winding and B the wave winding. The characters (.), (×), and (+), respectively, indicate the three different phases of the current supply. Fig. 5 illustrates the Görges diagram of the magnetomotive forces. As can be seen the total current in the slots is changing very evenly from, for instance, $4I_1$ in the first slot to $3I_1-I_3$ in the second slot and $2I_2-2I_3$ in the third slot and $J_1-3I_3$ in the fourth slot, to $4I_3$ in the fifth slot and so on. In that way a strong suppression of the higher harmonics is attained with the exception of that which is due to the total number of slots.

The leakage from the higher harmonics of the windings according to Figs. 3, 4 and 5, is 0.585% against 100% of the basic harmonic. A normal six phase winding with the same pitch has 0.738% and a cage winding with the same number of slots has 0.573% harmonics. From this it follows that the new arrangement of the winding suppresses the greater part of all the harmonics, which are not the result of the total number of slots, i. e. of 0.738—0.573—0.165% as there remain only 0.585—0.573—0.012% or 7.3% unsuppressed.

It can therefore be said that the winding according to the invention has a field similar to that of a cage winding and a so called cage commutation according to Latour, but with half the number of phases than was hitherto known.

If it is necessary or convenient to use a shorter pitch, it is possible, according to the invention, to make use of a winding pitch different from that shortened by one slot pitch. It is, for instance, possible to shorten the winding pitch by three slot pitches, as illustrated in Fig. 6 or by five slot pitches as illustrated in Fig. 9. Also in these cases the permanently commutating conductors are regularly distributed around the circumference of the armature. It is possible to use a winding pitch shortened or lengthened by any desired odd number of slot pitches. The current will remain distributed in two windings $bc$ and $da$ respectively, corresponding conductors of both windings $bd$ and $ca$, respectively, being at a distance of one pole pitch (or an odd multiple, as the case may be). The result of this arrangement is that the distribution of the current is regular in a winding according to Fig. 6 even if it has a shortened pitch ⁹⁄₁₂–¾ as illustrated in Fig. 7 wherein A indicates the loop winding and B the wave winding, and the vector diagram of the currents in the slots (Fig. 8) is very regular so that the harmonics are effectively suppressed.

Figure 11:
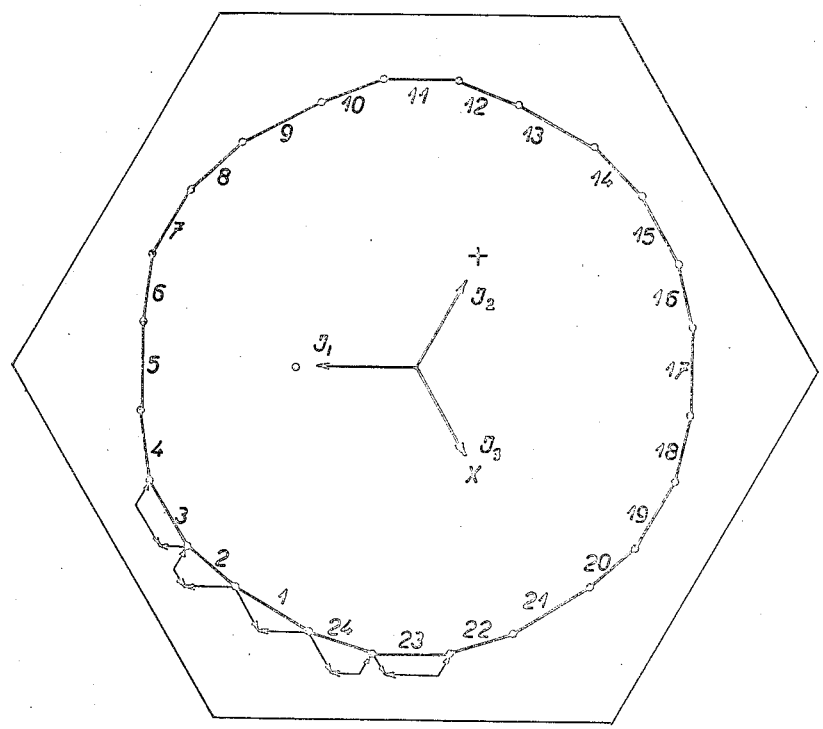
Fig. 11 is a vector diagram of the slot current of Fig. 9.

As it is known, any considerable shortening of the pitch of the windings known hitherto was disadvantageous especially with regard to strong harmonics which have a bad effect on the commutation; this is not the case with the arrangement according to the invention, because even with a very considerable shortening of the pitch the shape of the field is very favourable, almost sinusoidal, as can be seen in Fig. 11 which illustrates vectorially the magnetomotive force of the winding according to Fig. 9; that is, for the very considerably shortened pitch $\frac{7}{12}$. As can be seen, the 24 sided polygon is still very regular, and the field has no even harmonics.

It should be noted at this point that the winding described in this specification may accidentally occur with one of the infinite number of possible positions of the brushes of the so-called Schrage motor if the windings X, Y, Z in Fig. 3 are secondary windings and the brushes 1, 5, 9 are on one collector and the brushes 6, 10, 2 are on a second collector which may be moved against each other. The principle of the invention is, however, to be seen in the fact that a special combination of the number of slots, the number and kind of windings, the pitches for the windings, the number of phases and of the distribution of the brushes around the commutator is being used in the described way to obtain the described advantages for machines with fixed sets of brushes, which features are used permanently at all speeds of the machine. In contra-distinction to this fact, with the mentioned Schrage motor the advantages of the new arrangement occur only accidentally with one special number of revolutions. Therefore, the arrangement according to the invention is completely different from that of the Schrage motor even if the advantage of it may accidentally occur in one case.

Figure 12:
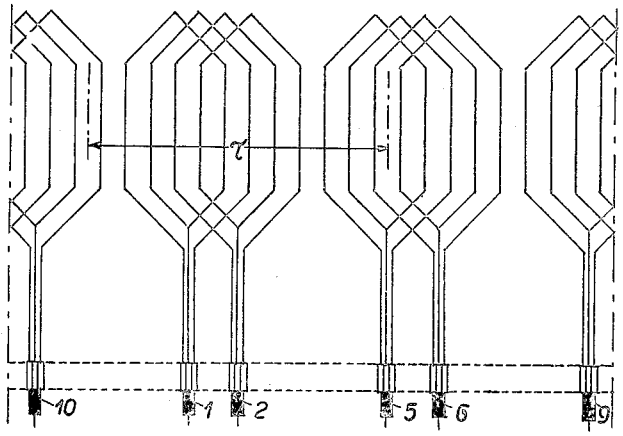
Fig. 12 illustrates a winding arrangement similar to that of Fig. 3 and having auxiliary winding sections connected in parallel with the main winding sections.
Figure 13:
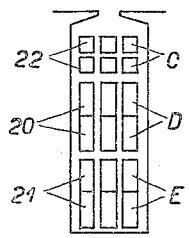
Fig. 13 is a cross-sectional view through an armature slot showing three windings arranged in the same slot.

For bigger outputs a multiple parallel winding may be conveniently used. The winding illustrated in Fig. 3 may for instance be double parallel. Assuming that for instance the number of segments for one slot is an odd number and the pitch of the coils is the same; it is advantageous to connect in parallel to this winding still another auxiliary winding, for instance, a parallel loop winding or still better a wave winding with a pitch of approximately ⅓. This winding is illustrated in Fig. 12 with a pitch $y_{1S}=4$ and again only those coils are shown which are just in a commutating position. Fig. 13 represents a cross section through a slot wherein 20 represents the main loop winding D, 21 the main wave winding E, and 22 the auxiliary winding C having a lower time constant. As can be seen, as a result of a convenient combination of all the elements, as explained above, all these coils are evenly distributed around the circumference. Therefore, the reactance of this dividing and protecting winding, which is connected to the segments or to the back connections of the winding, is very low, which is advantageous for the commutation. With the arrangement known hitherto, two phases of the auxiliary winding commutate at the same time on one slot.

This dividing winding can be a loop winding, or it is possible to arrange on the same machine one auxiliary loop winding and one auxiliary wave winding according to the principles explained above for the main windings.

Fig. 14 illustrates the winding as arranged for motors having a commutating voltage fed to the rotor. As shown, a winding similar to that shown in Figs. 3, 6 or 9, can be arranged in such a way that the brushes are connected to 6-phases of the stator winding, designated 31, 32, 35, 36, 39 and 40. These phases are so arranged that their phase difference corresponds to that of the corresponding brushes. Thus, between windings 31, 32, and 35, 36, and 39, 40, respectively, there is a phase difference of 30°, and between the windings 32, 35 and 36, 39 and 40, 31 the phase difference is 90°. This phase distribution can be easily effected by subdividing the winding into 12 equal groups, the first and third groups being connected in series and forming the winding 31, the second and fourth group forming the winding 32, the fifth and seventh group forming the winding 35, etc., as indicated in Fig. 14.

On the commutator of these machines the space in a tangential direction is usually very limited; therefore it is convenient to arrange opposite to each other the holders of those sets which are adjacent to each other.

With regard to the fact that with the majority of machines the number of segments is much greater than the number of slots (usually two to five times the number), it is possible to leave out regularly alternately a loop and a wave winding without affecting thereby the shape of the magnetic field.

A winding, corresponding to this further development of the invention, is illustrated in Fig. 15. The winding of Fig. 15 corresponds to that of Fig. 6, however with the difference that, if we proceed for instance from the segment number 1 into the slot 1, then through the slot 9 to the segment 4, thus forming a loop, a wave follows as a further coil from segment 4 into slot 23, and back through slot 15 to the segment 7; then again, a loop follows in the slots 4 and 12 connected to the segment 10, followed again by a wave in the slots 12 and 18 connected to the segment 13 and so on.

A thorough investigation of this winding shows that, although it has only a normal number of coils equal to the number of segments, the magnetomotive force of the winding is, even with an unsymmetric feeding according to Fig. 15, equally as regular as the winding according to Figs. 3, 6 or 9 with a double number of coils.

It is of course very advantageous if it is not necessary to double the number of coils, that is, if it is not necessary to sub-divide the conductors into two (equal or unequal) parts.

Naturally it is not necessary to alternate in sequence one loop and one wave after each other; it is also possible to alternate two loops and two waves after each other, and so on; or according to any other rule in such a manner that the number of loops and waves in series should be equal (or at least substantially equal).

With a double parallel winding it is, for instance, possible according to the invention to carry out one winding as a loop winding and the second winding as a wave winding; however, it is more advantageous to alternate loops and waves in such a manner that in every branch of a multiple parallel branches loops and waves should be formed in a substantially equal number, as is illustrated for instance in Fig. 15 in application to a triple parallel three branch winding, where in each of the three branches which begin, for instance, at the segments 1, 2, 3, respectively, a loop and a wave always alternate with the result that the magnetomotive force of every branch is equally distributed with regard to the north pole and south pole.

For instance, in Fig. 15 the accentuated conductors carry the current from brush 2 to brush 5, and although the brushes 2 and 5 are near to each other, the conductors in the slots 9, 12, 15, 18 are at a distance from the conductors 22, 1, 2, 4 which practically corresponds to the pole pitch, because the middle of the conductors of the one direction (tooth between the thirteenth and fourteenth slot) is precisely at a distance corresponding to the pole pitch from the middle of the conductors of the opposite direction (tooth between the first and second slot). Therefore the magnetomotive force of each branch is practically without even harmonic magnetomotive forces and all the branches together are completely without even harmonic fields.

For unusually big and complicated machines, according to a further development of the invention, use can be made of two windings with alternating loops and waves, as is illustrated for instance in Fig. 15; conveniently this arrangement can be carried out in such a way that both windings have a different time constant. It is convenient to shift both windings in opposite directions so that to every segment may be connected two windings with a different time constant, which can be either a loop with a small and a wave with a high constant or a wave with a small and a loop with a high time constant.

The resultant winding consists, for instance, of two windings with different cross sections according to Fig. 15 arranged in the same slots one above the other with that difference that the first one commences with a loop at segment 1, whereas the second winding commences with a wave at segment 1.

Summarizing, the invention winding arrangement comprises two windings, preferably a loop winding and a wave winding, having an equal number of parallel branches and which are connected in parallel to the same segments. These windings have a pitch which is increased or decreased relative to the pole pitch by an odd number of slot pitches. Thus, the conductors of both windings are set in four slots and are fed at $2m$ points in a bi-polar construction, where $m$ is an integral number greater than 2. The number of slots, in a bi-polar arrangement, is $4m$ and the feeding points are so distributed that their position is established by omitting one-half of the $4m$ regularly distributed feeding points in such manner that of feeding points positioned in diametrically opposed relation, one thereof is omitted.

While specific embodiments of the invention have been shown and described in detail to illustrate the application of the invention principles, it will be understood that the invention may be otherwise embodied without departing from such principles.

I claim:
1. In a dynamo-electric machine having at least one pair of poles and an armature having parallel, longitudinally extending circumferentially spaced slots and commutator segments, a pair of windings for said armature including conductors lying in the slots; each of said windings having the same number of branches and each branch of one winding being connected in parallel with a branch of the other winding between the same pair of commutator segments; the pitches of both windings being equal and differing from the pole pitch, such pitch difference, expressed in number of slot pitches, being an odd number and the spacing of corresponding conductors of such parallel connected winding branches being equal to the pole pitch; each winding branch spanning $4m$ slots; $m$, in a bipolar construction, being any integral number greater than 2; and the number of feeding brush positions for each branch being one-half the number of slots spanned by each branch and no two feeding brush positions being diametrically opposite each other.

2. A dynamo-electric machine as claimed in claim 1 in which one winding is a wave winding and the other winding is a loop winding.

3. A dynamo-electric machine as claimed in claim 1 in which such pitch difference is 1.

4. A dynamo-electric machine as claimed in claim 1 in which such pitch difference is greater than 1.

5. A dynamo-electric machine as claimed in claim 1 in which the conductors of each pair of parallel connected branches occupy four slots.

6. A dynamo-electric machine as claimed in claim 1 in which one winding is a wave winding and the other winding is a loop winding and the wave and loop branches are arranged in alternation circumferentially of the armature.

7. A dynamo-electric machine as claimed in claim 1 including two sets of brushes.

8. A dynamo-electric machine as claimed in claim 1 including two sets of brushes one set being connected to the beginnings of the machine stator windings and the other set to the endings thereof.

9. A dynamo-electric machine as claimed in claim 1 including two sets of brushes one set being connected to the beginnings of the machine stator windings and the other set to the endings thereof, said brush sets being shiftable in position relatively to each other for speed regulation.

10. A dynamo-electric machine as claimed in claim 1 including an auxiliary winding arranged in the slots and having a winding pitch less than that of said first-mentioned windings.

VILÉM KLÍMA.

REFERENCES CITED

The following references are of record in the file of this patent:

UNITED STATES PATENTS

| Number | Name | Date |
| --- | --- | --- |
| 728,259 | Lunt | May 19, 1903 |
| 1,628,611 | Powell | May 10, 1927 |